(12) United States Patent
Heusser

(10) Patent No.: US 9,777,973 B2
(45) Date of Patent: Oct. 3, 2017

(54) DEVICE FOR MIXING AND HEAT EXCHANGE

(71) Applicant: Rolf Heusser, Winterthur (CH)

(72) Inventor: Rolf Heusser, Winterthur (CH)

(73) Assignee: Promix Solutions AG, Winterthur (CH)

( * ) Notice: Subject to any disclaimer, the term of this patent is extended or adjusted under 35 U.S.C. 154(b) by 345 days.

(21) Appl. No.: 14/455,467

(22) Filed: Aug. 8, 2014

(65) Prior Publication Data
US 2015/0083375 A1   Mar. 26, 2015

(30) Foreign Application Priority Data
Sep. 20, 2013 (EP) .................................... 13185466

(51) Int. Cl.
| | |
|---|---|
| F28F 13/12 | (2006.01) |
| B01F 5/06 | (2006.01) |
| B01F 15/06 | (2006.01) |
| F28D 7/00 | (2006.01) |
| B23P 15/26 | (2006.01) |
| F28D 7/16 | (2006.01) |
| F28D 1/06 | (2006.01) |
| F28D 7/10 | (2006.01) |

(52) U.S. Cl.
CPC .......... *F28F 13/125* (2013.01); *B01F 5/0619* (2013.01); *B01F 15/066* (2013.01); *B23P 15/26* (2013.01); *F28D 7/0058* (2013.01); *F28D 7/1615* (2013.01); *F28D 1/06* (2013.01); *F28D 7/106* (2013.01); *F28F 2210/02* (2013.01); *Y10T 29/4935* (2015.01)

(58) Field of Classification Search
CPC ... F28F 13/125; F28F 2210/02; B01F 5/0619; B01F 15/066; B23P 15/26; F28D 7/0058; F28D 7/1615; F28D 1/06; F28D 7/106; Y10T 29/4935
USPC ...................................................... 165/109.1
See application file for complete search history.

(56) References Cited

U.S. PATENT DOCUMENTS

| | | | | |
|---|---|---|---|---|
| 4,093,188 A | * | 6/1978 | Horner ...................... | B01F 3/10 366/336 |
| 4,145,520 A | * | 3/1979 | Feltgen ................. | B01F 5/0619 528/323 |

(Continued)

*Primary Examiner* — Justin Jonaitis
(74) *Attorney, Agent, or Firm* — Francis C. Hand; Carella, Byrne, et al.

(57) ABSTRACT

A device (1) for static mixing and heat exchange comprises a cladding element (2) and a mixer insert (3), whereby the mixer insert (3) is in the operative state arranged inside the cladding element (2). The mixer insert has a longitudinal axis and comprises a first group (5) of web elements and a second group (6) of web elements. The first group (5) of web elements extends along a first common group plane (7) and the second group (6) of web elements extends along a second common group plane (8). At least a portion of the web elements (9, 10) is provided with channels (11, 12). The channels extend from a first end (13) of the web element (11) to a second end (14) of the web element (11). The cladding element (2) comprises a corresponding channel, which is in fluid connection with the first end (13) and the second end (14) of the web element whereby the transition from at least one of the first (13) and second ends (14) of the web element to the corresponding channel in the cladding element (2) is free from gaps.

13 Claims, 8 Drawing Sheets

(56) References Cited

U.S. PATENT DOCUMENTS

| | | | | |
|---|---|---|---|---|
| 4,275,177 A * | 6/1981 | Walkenhorst | ......... | B01F 15/066 165/109.1 |
| 4,865,460 A * | 9/1989 | Friedrich | ................ | B01F 5/061 138/42 |
| 6,217,208 B1 * | 4/2001 | Schuchardt | ............ | B01F 5/061 366/147 |
| 6,412,975 B1 * | 7/2002 | Schuchardt | ........... | F28D 7/0058 165/148 |
| 8,360,630 B2 * | 1/2013 | Schneider | ............ | B01F 5/0619 366/337 |
| 2001/0012235 A1 * | 8/2001 | Schuchardt | ........... | B01F 5/0619 366/337 |
| 2004/0251006 A1 * | 12/2004 | Marin | ............... | C03B 37/02718 165/157 |

\* cited by examiner

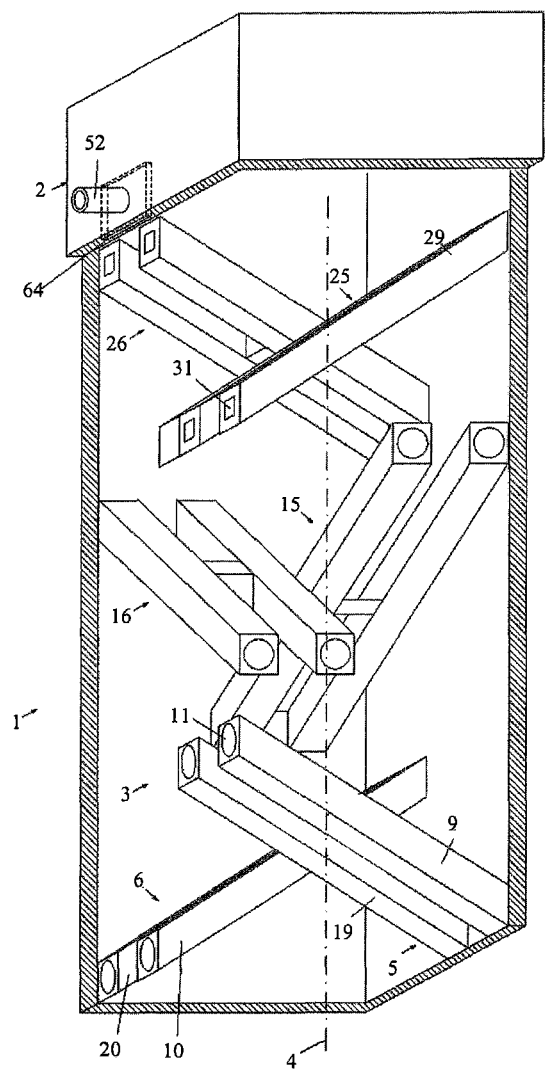

DEVICE FOR MIXING AND HEAT EXCHANGE

BACKGROUND OF THE INVENTION

The invention relates to a cost-effectively produced device for static mixing and heat exchange, particularly for cooling or heating of fluids, whereby the fluids comprise for example viscous or highly viscous fluids, in particular polymers.

Static mixers are used in many areas of the manufacturing industries. A characteristic of a static mixer is, that the flowable medium to be mixed is moved across at least one stationary mixer insert. The mixer insert used typically contains built-in elements, which cause a deflection of the fluid stream or of the flowable medium, which is guided through the mixing chamber. As opposed to dynamic mixers, a static mixer is free of moving parts. Dynamic mixers include for example, agitators, so that by the stirring a mixing of flowable medium is performed. In the static mixer, the flowable medium is transported through the static mixer by generating a pressure gradient. The pressure gradient may be generated for example by the use of pumps.

A number of different static mixers are known as described for example in CH-C-642564, EP0727249 B1 or EP0646408 B1 which are suited for mixing of fluids and more specifically suited for mixing viscous fluids. The task of the static mixer can be described as to produce homogeneous flowable media, which may be further processed in downstream process steps.

Such static mixers can also be cooled or heated from the outside, for example, by a jacket. In this case, the static mixer fulfills the function of homogenizing the flowable medium and in addition fulfills the object of a heat transfer, by heating or cooling the flowable medium. Under homogenizing a levelling out of physical and/or chemical and material properties of the flowable medium is to be understood which occurs for example by mixing the medium.

The heating and/or cooling capacity in static mixers is higher as compared to empty tubes with a double jacket, since the boundary layer between the fluid and the tube wall are replaced continuously by the mixer inserts arranged in the interior of the double jacket. The tube surface available for the heat exchange of the inner wall of the double jacket is predetermined and limited accordingly. It decreases with the increasing size relative to the volume of the interior space. Therefore, the cooling capacity and/or the heating capacity of such static mixers are especially severely limited for larger throughputs and sizes, if they are used as a heat exchanger. As a work around of this problem, shell and tube heat exchangers can be used for larger throughput quantities. A plurality of mutually parallel tubes are arranged in such a shell and tube heat exchanger. A fluid to be cooled or to be heated circulates through these tubes. A heat transfer fluid flows outside the tubes, for example as described in U.S. Pat. No. 6,206,086 B1. Even in such shell and tube heat exchangers, static mixers may be incorporated into the parallel tubes so as to additionally increase the heat exchange. Such heat exchangers have the disadvantage that the fluid flow has to be distributed to the individual tubes and thereby only the individual fluid strings can be mixed over the whole cross-section but not the entire fluid flow. Especially when cooling and for fluids with higher viscosity it can't be guaranteed with the device of U.S. Pat. No. 6,206,086 B1 that a homogeneous pattern of fluid flow is observed in all tubes. This can lead to different residence times of the fluid in the tubes, to deposits of the fluid along the walls of the tubes and depending on the product also to the decomposition of the fluid. Due to such effects, the cooling power of the device is reduced.

U.S. Pat. No. 7,997,327 B2 describes a heat exchanger in which the heat transfer fluid flows inside tubes which are arranged in the fluid flow similar to static mixing elements. The tubes are arranged as a tube bundle in a mixing space which is surrounded by a jacket tube. Such devices are hereinafter referred to as bundle heat exchangers. By the way of arrangement of the tubes a substantial heat transfer surface can be housed within a relatively small apparatus volume even in larger sized apparatuses, which results in a high cooling and/or heating capacity. In addition, the fluid stream does not need to be divided, but flows as a strand through the heat exchanger. The mixing and homogenization capacity of such heat exchangers is limited, however, because the crosswise arranged tubes in the mixing chamber are not considered as an ideal arrangement for mixing purposes. The tubes have too little resistance for generating an efficient cross-flow as compared to webs. The mixing effect is further reduced by the arc shaped tube especially in the marginal region adjacent to the inner wall of the jacket tube, which leads to a poor utilization of the heat transfer surface area of the jacket tube since the boundary layers along the jacket tube are insufficiently renewed. Since the tube bundle is connected only via the top plate to the jacket tube, the allowable pressure loss of such bundle heat exchangers is also limited.

The production costs of such heat exchangers are very high compared to conventional mixers or conventional heat exchangers, such as plate heat exchangers. Due to the resulting non-ideal mixing performance for such apparatus specifically for cooling of viscous fluids residence time differences of the fluid flow passing the heat exchanger are observed. Consequently there is a risk of deposits forming in the heat exchanger. Sensitive polymers can decompose as a consequence of the residence time differences. The non-ideal mixing performance and the mutual interference of the tubes leads together with an increased tube packing density lead also to a low efficiency of heat transfer, since the boundary layers between the fluid and the tube wall are not renewed in an ideal manner.

The document EP1967806A1 describes a possible solution to improve the mixing efficiency in apparatus. Such a solution is also described in U.S. Pat. No. 7,997,327 B2. It is proposed to use oval tubes which are connected with the broad side at a right angle with respect to the flow direction. Alternatively it is proposed to use parallel, identically oriented tubes. Both variants should help to increase the resistance for the fluid and thus to achieve better cross-mixing. In the embodiments in which the tube bundle is fixed on a head plate, the same disadvantages as described in connection with U.S. Pat. No. 7,997,327 B2 arise. Especially in the marginal region close to the inner wall of the jacket tube, the mixing effect is further reduced by the arc shaped tubes, which leads to a poor utilization of the jacket tube as heat transfer surface area since the boundary layers, which extend along inner wall of the jacket tube, are replaced insufficiently. Since the tube bundle is connected only via the top plate with the jacket tube, consequently the allowable pressure loss of such bundles apparatus is also limited.

EP1967806A1 also shows embodiments in which the oval tubes are connected to the jacket tube and the heat transfer fluid is fed through a double jacket. This embodiment improves the mixing effect in the edge region of the jacket tube due to the fact that no more arc shaped tubes have to be used. It has been shown that the production of such equipment with oval tubes and a jacket tube is very complex due to the fact that the individual tubes must be precisely connected to the casing pipe. In particular gaps must be avoided on the fluid side between the tubes and the jacket tube, due to the fact that deposits form from the fluid flow, which can lead to degradation effects of the tube material. In addition the accessibility for cleaning is greatly deteriorated.

Commercially available oval tubes have relatively large external tolerances, therefore the formation of gaps can't be prevented, so that an elaborate reworking of the oval tubes is required. Existing gaps on the fluid side can be poorly removed by subsequent processes such as welding or soldering as the transitions between the tube and the jacket tube especially in tube groups which are closely arranged behind one another are not accessible for reworking.

In addition, it is technically complex to seal the heat transfer medium constantly from the flowable medium. That means, there is a risk of a contamination of the media. A leak caused by leakage is difficult to seal due to the poor accessibility of the tubes. It has been further shown that even when using oval tubes a large amount of fluid tends to flow still laterally over the tubes and a small amount of fluid is transported across the cross-section of the apparatus. The use of flat tubes which have only lateral radii, and accordingly allow a better cross-flow of the fluid, there is a risk that they do not withstand the pressure difference between the fluid chamber and the heat transfer fluid. Thus, such flat tubes would have to be made very thick-walled. In addition to the non-ideal geometry of the tube, the mixing effect is additionally limited in the devices shown, due to the fact that all tubes are aligned when viewed in the flow direction. However, it has been shown that for achieving a good mixing effect at least one second tube group should be provided that is offset, for example, 90 degrees to the first tube group.

WO2008/141472 A1 and EP1067352B1 describe heat exchangers containing tubes in which the heat transfer fluid flows in parallel to the tubes arranged in the fluid flow. These tubes are also provided with webs, which are configured as baffles, which are mounted at an angle of typically 45 degrees to the flow direction. These webs are configured to exchange the boundary layers between the central fluid flow and the flow along the tube wall continuously. Such devices are referred to as tube-web heat exchangers. Even in such apparatus, a relatively large heat exchange surface area can be accommodated in a relatively small apparatus volume, depending on the packing density of the tubes. A problem with such devices is that with increasing tube density the mixing effect significantly deteriorates since the tubes arranged in parallel to the fluid flow disrupt the cross-flow of the fluid and therefore the mixing performance decreases. The cost of such equipment is very high compared to conventional mixers or conventional heat exchangers, such as plate heat exchangers. Due to the non-ideal mixing performance for such apparatus specifically regarding the cooling of viscous fluids differences in residence time distribution result and there is the danger of deposits. Sensitive polymers can decompose in such apparatus. The non-ideal mixing performance and the mutual interference of the tubes leads to increased tube packing density also results in a relatively poor heat transfer efficiency, because the interfaces between the fluid and the tube wall are not renewed in an ideal manner.

In document DE 689 05 806 T2 it is described a way to overcome these drawbacks. However, the tubes with a circular cross section shown in this document have the inherent disadvantage that the mixing performance is not optimal due to the small resistance to the flow of the tubes, which are arranged in this flow. Therefore, the solution shown in DE 689 05 806 T2 has proven to achieve a heat transfer from the tubes to the flow inside the tube. However, due to the geometric restriction of the cylinder geometry only a limited mixing performance is observed that doesn't encompass the entire cross section of the mixing chamber, which is named in the document as conduit. EP 1 123 730 A2 discloses a static mixer, which includes tubes as mixing elements. The tubes are arranged in lattices that are rotated around the center axis of the mixing element. There are three or four lattices used, which are arranged in an angle of 120° or 90° to each other.

In the document EP 0 967 004 A1 a static mixer is proposed as well, which is equipped with channels for a fluid heat medium. This static mixer is disposed with serrated plate elements arranged in the direction of flow, which lie crosswise onto each other. The plate elements are referred to as webs. These webs extend over the entire width of the mixing element. The webs are constructed as thick-walled elements, as they contain a channel leading transversely to the main direction of flow through each of the webs. The serrated webs cause a slight and only local cross-mixing, which does not comprise the entire cross section of the mixing chamber. The fluid flow incident on the web is divided by each web into two lateral main part streams flowing laterally past the web and at least one auxiliary part stream of the fluid flow, which is deflected from the serrated plate element from a spike peak extending into the fluid to the nearest valley of the serrated plate element. The auxiliary part stream is deflected from each of the spike peaks, so that a partial deflection of the auxiliary part stream is obtained. However, this deflection remains limited to the small auxiliary part stream and only to a part of the cross section of the mixer, as each web contains a plurality of tines. Therefore, the portion of transverse mixing in the mixer shown in EP 0967004 A1 is small.

A variant of such a static mixer is shown in EP 1384502 A1. As described in EP 0967004 A1 the channels for a heat transfer fluid extend substantially transverse to the main flow direction. The channels of EP 1384502 A1 run inside of finned tubes. The ribs may, for example, project into the fluid flow in a star-shaped manner. These ribs cause a slight deflection or transverse displacement of the fluid flow, which remains restricted to a local environment of the ribs. Since the ribs are not flowed through by a heat transfer fluid, their use as a heat exchange surface is limited. On the other hand they require a relatively large amount of space. Therefore a more dense packing of tubes which can be flowed through by the heat transfer fluid can't be realized, and accordingly the obtainable heat transfer surface area is reduced.

Under local mixing a cross-mixing in the immediate vicinity of the finned tube is to be understood, i.e. an environment that is limited in its size to twice the tube diameter and occurs at most to the end of the ribs. A plurality of tubes is arranged side by side transversely to the flow direction. That is, for two tubes at most half of the fluid flowing to the tubes as auxiliary part stream is guided along the edges of the ribs and can thereby cause a transverse flow. Here, too, a plurality of tubes is arranged side by side transversely to the main direction of flow. The transverse mixing occurring only over a part of the mixer cross-section can also lead to the formation of locally different thermal profiles and concentration profiles, which can have the consequence that with this mixer no homogeneous mixture is obtainable. A homogeneous mixture can only be ensured if a part of the fluid is transversely mixed over a large part of the whole cross-section.

It is mentioned in particular in connection with an embodiment, that a defined gap to the housing is desired, such that a complete flow around the web tubes is possible. In this embodiment a plurality of rows of web tubes are arranged in the flow direction one behind the other. This means that the partial flow which flows towards a web tube, although divided by the web tube, is joined downstream of the web tube again, so that a mixing takes place only within the part stream. Adjacent part streams which are shared by adjacent web tubes are not influenced by this mixing, thus the mixing occurs only locally.

There are mixers which have fittings which permit thorough mixing of the total fluid flow over the entire cross section of the mixer, such as the static mixer shown in U.S. Pat. No. 4,466,741. This mixer consists of successively arranged mixing elements. Each of these mixing elements contains the installations, which divide the flow as a cutting element and redirect the streams. For this purpose, the deflecting baffles on which cause a partial flow of the right half of the mixer is deviated to the lower half of the mixer. Adjacent mixing elements are arranged such that the partial streams are continually subdivided and deflected. However, these inserts are thin-walled channels can't be provided in such installations. The reason for this is that thin-walled webs have a lower pressure drop for the same resulting mixing action. Thus, mixers are designed with sleeve, so that the thin-wall fittings are fixedly connected to the sleeve in order to ensure the necessary dimensional stability.

A further example of such a static mixer is to be found in WO2007/113627 A1. In this document, thin walled inserts are shown as well. These inserts would not be suitable for channels which extend in the interior of these inserts. In FIG. 5 an embodiment with cross-wise arranged webs is shown, which is executed as a welded configuration. Until this point in time it was uncommon to manufacture the crossing webs in a thin-walled configuration as a monolithical part. The document US2004/0114461 A1 shows, that for realizing a monolithical mixing element thick-walled webs had to be provided. The end portions of the web elements are according to this embodiment not connected to the inner wall of the mixer. The mixer element is fixed to the mixer wall by annular segments. These annular segments form the carrier element for the web elements. The end portions of the web elements extend freely into the flow, they are not fixed to the mixer inner wall. The thick walled configuration is therefore necessary for the structural stability of the web elements, in particular if the mixer is used for highly viscous fluids. No hollow spaces such as channels should be foreseen inside the web elements for the reason of the strength of the materials. Due to the fact that the cladding element and the end portions of the web are not connected to each other the heat exchanging fluid can't enter the cladding element through the end portions of the web element, it would not be considered as an advantage to foresee channels in these thick walled webs. If a channel extends in the interior of the web elements, the heat exchange fluid in the web elements will not be able to circulate and therefore no heat supply or heat discharge may occur. For this reason the device of US2004/0114461 A1 would not be suitable as a heat exchanger.

It is an object of the invention to provide a device for mixing fluid media optimally and cool them efficiently at the same time or heat them. In addition, the device should be configured such that it can withstand high fluid pressures and is suitable for processing of viscous or highly viscous fluids. In addition, the device should not have any gaps on the side facing the flowable medium, which may lead to deposits. In addition the device should be manufactured by an economic manufacturing method.

SUMMARY OF THE INVENTION

A device for static mixing and heat exchange comprises a cladding element and a mixer insert, whereby the mixer insert is in the operative state arranged inside the cladding element. The mixer insert has a longitudinal axis, which extends substantially in the direction of flow of the flowable medium.

The mixer insert comprises a first group of web elements as well as a second group of web elements, whereby the first group of web elements extends along a common first group plane and the second group of web elements extends along a second common group plane. The group plane is characterized in that it contains the central axis of the web elements. At least a portion of the web elements is disposed with channels, whereby the channels extend from a first end of the web element to the second end of the web element.

The cladding element contains a corresponding channel, which is in fluid connection with the first end and the second end of the web element, whereby the transition from at least one of the first and second ends of the web element to the corresponding channel in the cladding element is free from any gap. At least a portion of the web elements extends therefore over the entire lateral dimension or the diameter of the cladding element. The channels in the web elements extend from the first end of the web element to the second end of the web element which connects directly to the inner wall of the cladding element. Inside the cladding element, there is located a channel, which connects to the end portion of the channel to the corresponding end portion of the web element. The web elements can therefore be fed from the cladding element with a heat exchange fluid, in particular a heat exchange liquid, and the heat exchange fluid flows through the web elements. The length of the channel is greater than the mean diameter of the cladding element, if the web element comprises the longitudinal axis.

The average diameter corresponds to the inner diameter, if the cladding element is configured as a circular tube. The mean diameter for an edged cladding element is defined as its circumference/$\pi$, thus it is an equivalent diameter. The length of the channel is at least 10% above the mean diameter if the channel crosses the central axis. The length of this channel lies in particular at least 20% above the mean diameter, particularly preferred at least 30% above the mean diameter.

A web element is characterized by its dimensions, thus its length, its width and its thickness. The length of the web element is measured from the first end of the web element to the second end of the web element. The length of the channel corresponds substantially to the length of the web element.

The width of the web element is measured substantially laterally to the direction of flow. That means that the width extends substantially in a plane which is arranged normally to the length of the web element and shows the cross-section of the web element. The cross-section of the web element is characterized by its width and its thickness. The length of at least the longest web elements of a group of web elements is at least 5 times as long as its width.

The width of the web element is 0.5 to 5 times as large as its thickness, advantageously 0.75 to 3 times as large as its thickness. If the width of the web element is once or twice the thickness, a particularly preferred range is obtained, which provides a particularly good transversal mixing. The width of the web element is defined as the normal distance between the first edge and the second edge of the web element viewed from the upstream side. The width of the web element on the upstream side can differ from the width of the web element measured on the downstream side.

Under the edge is intended the edge of the web element onto which the flow impinges upon and passes by, said edge extends substantially parallel to the length of the web element. The thickness of the web element can be variable. The minimal thickness is less than 75% advantageously less than 50% of the maximal thickness. The variations can be caused by ribs, by indentations, by protrusions or by wedge-shaped web elements or another unevenness.

A web element is characterized in that planar surfaces or concave surfaces are present in the direction of flow, which offer an impact surface for the flowing fluid. These surfaces arranged in the direction of flow have the effect of a higher resistance of the downstream flow. It has been shown that a tube element has a small mixing effect. A tube element has been described as a solution in the document DE 68 905 806 T2. The tube element has a noteworthy worse mixing effect compared to web elements. In addition, in document EP 1 384 502 A1 it is pointed out that round profiles arranged in the fluid flow have a small mixing effect.

The channel, which is arranged inside the web element has advantageously an inner diameter, which corresponds to a maximum of 75% of the thickness of the web element. Basically, also a plurality of channels arranged substantially parallel to each other can be arranged in a web element.

The transition from at least one of the first and second ends of the web element to the corresponding channel in the body of the cladding element is free from gaps. The web elements of the mixer insert as well as the cladding element are thus composed of a singular piece, which is advantageously manufactured by a casting method. It is a characteristic of the property of a transition, which is free from gaps, such that the transition from the web element to the cladding element occurs smoothly. In particular, the edges are rounded in the transition area between the web element and the cladding element, whereby the flow of the casting material is not hindered during the manufacturing process.

The channels are arranged inside the web elements such that there exists no connection between the channels inside the web elements and the mixing space surrounding the web elements.

During the casting method, a monolithical structure is manufactured at least in segments consisting of a first and second group of web elements arranged in an angle to the main direction of fluid flow which is not equal to zero and a cladding element which is fixed to at least a portion of the web elements, whereby the cladding element can be configured as a cladding tube.

The web elements are provided at least partly with channels which can be used by a heat transfer fluid in operative condition. The channels are in operative condition not in connection with the flowable medium, said flowable medium flows around the web elements. The channels extend from a first end of the web element to a second end of the web element. The cladding element contains at least one corresponding channel, which is in fluid connection with the first end and the second end of the web element, whereby the transition between at least one of the first and second ends of the web element to the corresponding channel in the cladding element is free from gaps. The length of the channel is greater than the mean diameter of the cladding element, if the web element contains the longitudinal axis.

The channels for the heat exchange fluid in the web elements can be manufactured by the casting method, however a subsequent reworking step can also be performed, such as eroding or boring. Surprisingly it has been shown, that the direct casting of the channels or a subsequent boring of the channels is possible in a very simple and economic manner.

During the casting method a casting mold is manufactured by means of a wax body, a ceramic shell is then applied onto the wax body, subsequently the wax is removed and the ceramic shell is burned and the burnt ceramic shell is filled with casting material. The casting material is hardened by cooling and the ceramic shell is removed after the hardening of the casting material has been completed. The device can be manufactured from any material which is suitable for being processed by a casting method, such as metal, plastic or a ceramic material. The web elements are advantageously configured as rectangles, whereby the edges may also be rounded. The edges can also assume any other cross-section, in particular a cross-section from the group of circles, ovals, rectangles with rounded edges or polygons. The cross-sectional areas can be different in each single web element or can differ between a pluralities of web elements, as an example, the thickness or the width of a web element can vary. Under a cladding element, a cladding of the mixer insert of arbitrary cross-section and geometry is to be understood, including for example also a tube or a rectangular channel.

The heat exchange fluid may comprise any liquid, such as water or oils or also any gas, such as air. The web elements are arranged advantageously in an angle of about 25 to 75 degrees and more advantageously in an angle of about 30 to 60 degrees with respect to the main direction of fluid flow.

According to an embodiment, the first and second group planes intersect. According to a further embodiment, a web element of the second group follows a web element of the first group. Neighboring web elements thus have according to this embodiment a different orientation, as they belong to different groups.

According to a preferred embodiment, neighboring web elements intersect, whereby such an arrangement enhances the mixing effect. The angle between two web elements crossing each other is advantageously 25 to 75 degrees. A group can comprise any plurality of web elements arranged next to each other. A group is characterized in that the central axes of all web elements span the same or substantially the same group plane. In particular, 2 up to and including 20 web elements are arranged in a parallel configuration in a group, particularly preferred 4 up to and including 12 web elements.

It is possible to arrange any plurality of groups of web elements behind each other, when looking in the main fluid flow direction. The groups arranged subsequently to each other are advantageously configured in a manner that they overlap to generate the largest possible active heat exchange area in a small apparatus volume. Overlapping means, that at least a portion of the web elements of to first group and a portion of the web elements of a subsequent group and/or a preceding group are arranged in the same tube section, seen in main fluid flow direction.

The projection of the length of the web element onto the longitudinal axis results in a length L1 and the projection of the overlapping part of the web elements of the neighboring group onto the longitudinal axis results in a length L2, whereby L2 is smaller than L1 and L2 is greater than 0. The tube section considered is thereby defined by having the length L1 that means that the tube section extends from the centrally arranged web element from its first end to its second end, when projected onto the longitudinal axis.

Due to the fact that the mixing effect in groups of web elements of the same orientation arranged behind another takes place only in one plane, the orientation is changed after a certain number of groups, such that the groups are advantageously arranged in a staggered manner with respect to each other.

In particular two up to and including 20 groups are foreseen, particularly preferred 4 up to and including 8 groups. The dislocation between the groups oriented in the same way is advantageously in an angle of 80 degrees to 100 degrees thus the first group is arranged transversely to the second group in an angle of 80 to 100 degrees. That means that the second group is rotated around the main axis of the mixer insert about an angle of 80 to 100 degrees with respect to the first group.

In addition to groups of crosswise arranged web elements as outlined above, groups of web elements in particular in the final section of parallel groups of web elements can be foreseen, which contain web elements which extend only from the inner wall of the cladding element to the crossing line of the other group. In the following, these groups of web elements are referred to as half crossing web element groups. These groups lead to an increase in mixing performance. Due to the better mixing effect and the additional thermal conduction of the web element material, the heat exchange is additionally increased.

The web elements of the first and second group may touch each other mutually or may contain intermediate spaces. A connection of the intermediate spaces with connection web elements arranged transversely to the main direction of fluid flow is also possible.

The heat exchange fluid is advantageously supplied over a double jacket and flows therethrough as well as through at least a portion of the crosswise arranged web elements. Thereby not only the surface of the inner wall of the cladding element, but also the surface of the heated or cooled web elements can be used as a heat exchange surface. The double jacket can be formed on the inner side by a cladding tube and on the outer side by a second outer cladding tube. The outer cladding tube contains connections for the supply and discharge of heat exchange fluid. Between the cladding tube and the outer cladding tube, vanes are advantageously arranged, which guide the heat exchange fluid in the double jacket through the web elements, whereby the apparatus is subjected mostly to an even flow. It is possible that the flow through different portions or segments of the device according to the invention is separated by double jacket segments. This allows for a different temperature regime in each of the segments. The heat exchange fluid can be supplied directly from the outside to the web elements. Thereby the use of the cladding tube as a heat exchange surface is limited. It has been shown, that for a high heat exchange rate in a small apparatus having diameters of the cladding tube of 60 mm or more, at least half of the web elements would have to be exposed to the heat exchange fluid flow.

It has been shown that it is possible to obtain a very economic casting manufacturing method for the web elements and the cladding element connected monolithically and gap-free to the web elements. Thereby the complete cladding element together with the corresponding web elements can be manufactured in one piece or a number of segments can be manufactured separately, which are subsequently connected for example by welding or by screwed flange connections. Furthermore, the external geometry of the web elements and the channel geometry for the heat exchange fluid can be easily decoupled. For the external geometry, rectangular profiles can be used advantageously and the geometry of the channel can be a round cross-section, in particular chosen from a circular or oval cross-section. Thereby web elements with an ideal profile for a transversal mixture and at the same time of a high strength can be manufactured for high maximum fluid pressures. It has been shown that the passages for the heat exchange fluid in the web elements can be manufactured advantageously after the casting process by eroding or even more advantageously by boring. Thereby even smallest channels can be manufactured.

It has been further shown, that with the inventive groups of web elements and in particular with web elements in which neighboring web elements intersect and/or in particular with overlapping groups of web elements a very good mixing performance can be obtained. A fast mixing can be particularly promoted by the arrangement of the second group, which is staggered about 80 to 100 degrees with respect to the first group. Surprisingly it has been shown that the arrangement of additional partial groups for viscous fluids in particular a further improvement of the mixing performance that means a higher mixing quality.

Due to the fact that the heat exchange fluid flows in the inner space of the double jacket and inside the web elements, the mixing performance is not decreased by additional inserts of tubes, which are used as a passage for the heat exchanging fluid. In addition, the mixing performance in the boundary region is improved by the direct transition of the web elements to the cladding element due to the fact that boundary layers of the flowable medium close to the inner wall also participate to obtain a homogeneous mixture. In particular, not only an optimal renewal of the boundary layers between the flowable material and the cladding element but also between the flowable medium and the surface of the web element can be obtained. The optimal renewal of the boundary layer also has the consequence of an optimal use of the heat exchange area. The optimal use of the heat exchange area also leads also to the construction of a device for a given heating or cooling task of a small apparatus volume with a very mall pressure drop.

Due to the optimal mixing effect, the inventive device also has a very narrow residence time distribution of the flowable medium to be heated or cooled. Thereby deposits or the decomposition of the flowable medium can be avoided in the best possible manner. A very low melting temperature close to the freezing point can be obtained for cooling tasks which concern the cooling of viscous fluids, such as for example a polymer, due to the optimal renewal of the boundary layers. Hereby it is avoided, that a hardening polymer forms a deposit on the heat exchange surfaces. The direct transition of each of the web elements to the cladding element leads to a very stable construction, which is suitable also for operation with high fluid operating pressures. Thereby the inventive device can be of a very compact construction in particular for the operation with viscous fluids. The device is principally suitable for mixing and cooling or heating of any flowable medium, such as a liquid or a gas, in particular for viscous or very viscous fluids, such as polymers.

The cladding element and the mixer insert consist in particular of castable material, for instance metals, ceramics, plastics or combinations of these materials may be used.

BRIEF DESCRIPTION OF THE DRAWINGS

In the following, the inventive device is shown according to some embodiments. It is shown in FIG. 1: a two dimensional sectional view through a first embodiment of the inventive device

The device 1 for static mixing and heat exchange consists of a cladding element 2 and a mixer insert 3, whereby the mixer insert 3 is in operation arranged in the interior of the cladding element 2. The cladding element is configured as a hollow body. The mixer insert is received in the hollow body. The mixer insert 3 has a longitudinal axis 4, which extends substantially in the main direction of fluid flow of the flowable medium, which flows through the cladding element 2 in the operative state. The mixer insert comprises a first group 5 of web elements and a second group 6 of web elements.

Figure 1:
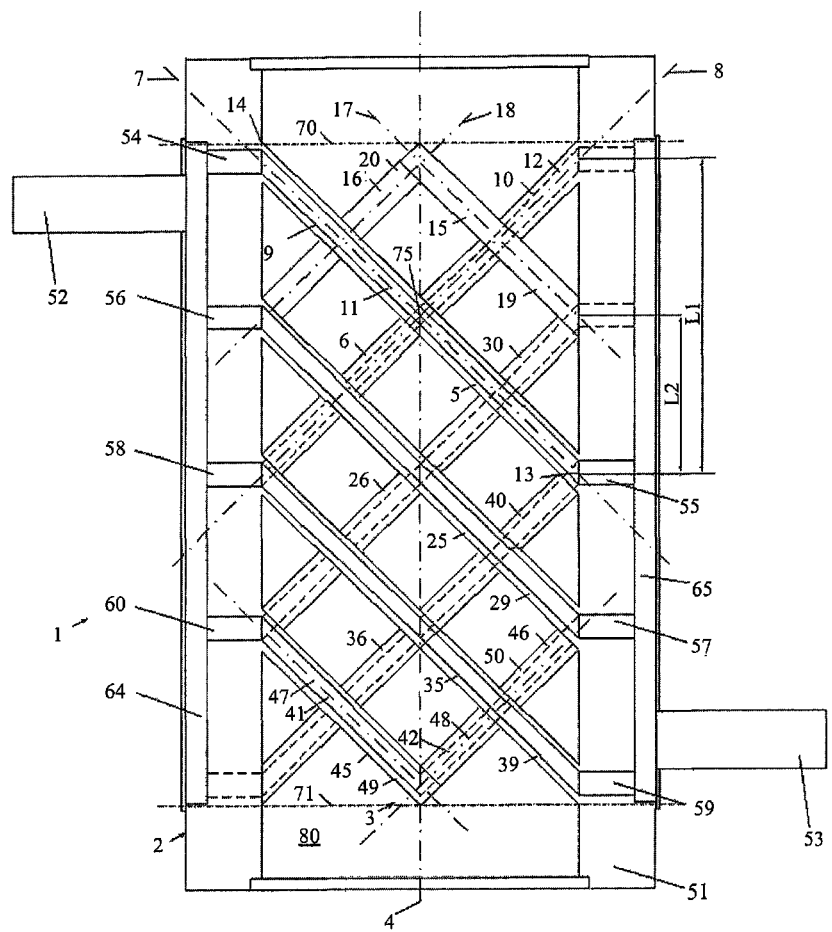
In FIG. 1 there is further shown the first group 14, the second group 16, the first group 25, the second group 26, the first group 35, the second group 36, as well as the first group 45 and the second group 46. With the exception of the pairs of groups 15, 16 and 45, 46 all pairs of groups are configured in the same manner. Therefore the subsequent description is valid for the first groups 5, 25, 35 as well as for the second groups 6, 26, 36. Each group can comprise a plurality of web elements. Depending on the size of the mixing space 80 and/or the width of the web elements 2 to 20, preferably 4 to 12 web elements of a group can be arranged parallel to each other. The distance from the first end 13 to the second end 14 of the web element along its central axis is defined as the length of a web element. The dimension extending in a direction normal to the central axis from an edge to the oppositely arranged edge is defined as the thickness of the web element. The dimension transverse to the longitudinal axis 4 is defined as the width of the web element that is the dimension which is in FIG. 1 normal to the plane of the drawing.

The first group 5 of web elements extends along a first common group plane 7. The group plane 7 comprises the longitudinal axis of a channel 11 extending in the interior of the web element 9, if the channel is arranged such that its longitudinal axis coincides with the central axis of the web element. In this visualization the group plane 7 extends normally to the plane of the drawing.

The second group 6 of web elements extends along a second common group plane 8. The group plane 8 is defined in the same manner as the group plane 7. The first and second group planes 7, 8 cross each other. In this visualization they cross exactly at the longitudinal axis 4 of the mixer insert. A web element 9 of the first group follows a web element 10 of the second group. The web element 9 is thus arranged cross-wise to the web element 10. The web elements of the first group alternate thus with the web elements of the second group. The web element 9 is cut open along its longitudinal axis, so that one half of the channel 11 is visible. The web element 10 is positioned behind the web element 9 with respect to the plane of the drawing. Therefore it is not shown as section and the channel 12 running through the web element 10 is shown in a dotted line. The channel 11 of the web element 9 of the first group runs from a first end 13 to a second end 14 of the web element. The channels 11, 12 may have a cross-sectional area in the shape of a round element. A round element may comprise an element from the group of circles, ovals, rectangles with rounded edges or polygons.

The mixer insert and the cladding element 2 according to FIG. 1 are manufactured as a monolithical structure by a casting method. The cladding element 2 is composed of a jacket body 51 which comprises a feed stub 52 and a discharge stub 53 for a heat exchange fluid. The jacket body comprises a distribution channel 64 for the distribution of the heat exchange fluid onto a plurality of feed channels and a collecting channel 65 for collection of the heat exchange fluid from a plurality of discharge channels. For example, each feed channel 54 and each discharge channel 55 are connected with the first end and the second end 13, 14 of the web element by a fluid path. A feed channel 56, 58, 60 is foreseen for each of the web elements containing channels, which feeds the heat exchange fluid to the corresponding channel in the web element and a channel 57, 59, which directs the heat exchange fluid from the channel in the web element to the collecting channel 65 of the jacket body 51.

In FIG. 1 the web elements 9, 29, 39, 49 are shown in a sectional view, the web elements 10, 20, 30, 40, 50 are positioned behind with respect to the drawing plane. The channels with these web elements are not visible, therefore they do not carry reference numbers.

The transition from at least one of the first and second ends 13, 14 of the web element 11 to each of the corresponding channels 54, 55 is free from gaps. The web elements of the mixer insert 3 as well as the cladding element 2 consist accordingly of a single part, which is advantageously manufactured by a casting method.

The method for manufacturing the device 1 for mixing and heat exchange as shown in FIG. 1 is obtained at least for segments as a monolithical structure by way of a casting method. The device 1 comprises the mixer insert 3 and the cladding element 2. The monolithical structure comprises a first and second group 5, 6 of web elements 9, 10 and a cladding element 2 which is fixed to at least a portion of the web elements, whereby the groups are arranged in an angle which is not equal to zero with respect to the main direction of fluid flow.

The web elements 9, 10 have channels 11, 12. A heat exchange fluid passes through these channels in the operative state. The heat exchange fluid is not in connection with the flowable medium, which flows around the web elements. During the casting method a casting mold is manufactured by means of a wax body, a ceramic shell is then applied onto the wax body, subsequently the wax is removed and the ceramic shell is burned and the burnt ceramic shell is filled with casting material. The casting material is hardened by cooling and the ceramic shell is removed after the hardening of the casting material has been completed.

Figure 5:
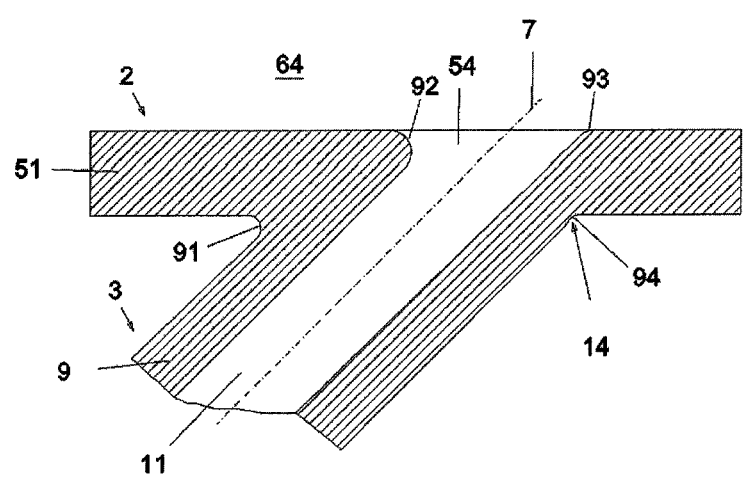

For manufacturing the web elements 9, 10 and the corresponding channels 11, 12 by the casting process without defects, in particular without holes, the transitions from the cladding element to the mixer insert are advantageously foreseen with rounded portions, which is shown in FIG. 5 in detail. FIG. 5 is an enlargement of the region around the second end 14 of the web element 9. Advantageously, all other ends are provided with similar rounded portions. In FIG. 5 a rounded portion 91 is shown, which forms the transition from an upper edge or an edge surface of the web element 9 to the inner side of the jacket body 51 of the cladding element. A round portion 94 forms the transition from the lower edge or the lower edge surface of the of the web element 9 to the inner side of the jacket body 51 of the cladding element. The transition from channel 54 to channel 11 is achieved also by a rounded portion. A convex rounded portion 92 and an oppositely arranged convex rounded portion 93 are shown in cross-section. Each of the rounded portions 91, 92, 93, 94 can in particular have a radius of at least 0.5 mm.

Any number of groups of web elements can be arranged consecutively in main fluid flow direction. According to this embodiment a plurality of first partial groups 25, 35 is shown next to the first group 5. Group 5 has been used exemplarily to describe the first partial groups. The first partial groups 25, 35 are configured in the same manner as the group 5, for this reason the description of the group 5 is also used as a proxy for the groups 25, 35. In the same manner the group 6 is used as a proxy for the partial groups 26, 36. The second partial groups 26, 36 are configured in the same manner as the second group 6.

Furthermore, a first partial group 15 and a second partial group 16 are shown in FIG. 1, their web elements don't contain a channel. Thus a portion of the web elements may not contain a channel. In addition the web element 19 of the first partial group 15 extends only from the jacket body 51 to the longitudinal axis 4. The web element 20 of the second partial group 16 also extends only from the jacket body 51 to the longitudinal axis 4. The first and second group planes 17, 18 of the web elements 19, 20 intersect on the longitudinal axis 4. The first partial group 15 and the second partial group 16 form a right hand end of the mixer insert. The right hand end is characterized by an end plane 70, which is a plane arranged normally to the longitudinal axis and passes through the right handed end points of the web elements 19, 20. It forms the right handed final section of the mixer insert. On the right side of the end plane 70, a further mixer insert can follow. The mixer insert can comprise a first group of web elements and a second group of web elements, whereby the first group of web elements is rotated about an angle between 80° and 100° with respect to the first group 5 about the longitudinal axis and the second group of web elements is rotated about an angle between 80° and 100° with respect to the second group 6 about the longitudinal axis. This additional mixer insert is not shown in the drawings. If consequently the first partial group and the second partial group are missing a gap would result, which would offer the flowable medium less deflection possibilities and would consequently entail a less optimal mixing of the flowable medium.

According to a variant, the partial groups forming the end of the mixer insert can contain also channels to additionally improve the heat exchange. Therefore in FIG. 1 a first partial group 45 and a second partial group 46 are shown, the web elements 49, 50 thereof each contain a channel 41, 42. The channels 41, 42 of neighboring web elements can be connected, such that the heat exchange fluid can reach a discharge flow channel from the feed flow channel 60, whereby said feed flow channel is arranged behind the discharge flow channel 57 and is thus not visible in the drawing. In addition, the web element 49 of the first partial group 45 extends only from the jacket body 51 to the longitudinal axis 4. The web element 49 of the second partial group 46 also extends only from the jacket body 51 to the longitudinal axis 4.

The first and second group planes of the web elements 49, 50 intersect on the longitudinal axis 4. The first partial group 45 and the second partial group 46 form a left hand end of the mixer insert in the view shown in FIG. 1. Said left hand end is characterized by an end plane 71, which is a plane arranged normally to the longitudinal axis 4 and passes through the left hand end points of the web elements 49, 50. Said end plane forms the left hand final section of the mixer insert. On the left side of the end plane 71, a further mixer insert can follow.

That means the group plane 7 of the first group 5 crosses with the second group plane 8 of the second group 6 such that a common intersection line 75 is formed, which has an intersection point with the longitudinal axis 4 or runs substantially transverse to the longitudinal axis and/or has a minimal distance to the longitudinal axis in a normal plane with respect to the intersection line, which contains the longitudinal axis. In this configuration, the web elements have a symmetrical configuration with respect to the intersection plane, such that the mixing in the partial section of the mixing space 80 positioned above the longitudinal axis is about the same as the mixing in the partial section of the mixing space positioned below the longitudinal axis.

As described earlier FIG. 1 shows two groups 15, 45, 16, 46 of web elements, which extend substantially to the intersection line 75, whereby it is ensured that no gaps develop, which do not contain any web elements. The mixing of the flowable medium would not be performed in the same way in such gaps as compared to the portions of the mixing space containing such web elements.

According to an embodiment not shown in the drawings, the mixer insert can consist only of a first group 5 and a second group 6 of web elements. For this reason, the first group 5 and the second group 6 are regarded as representative for a plurality of similar first or second groups in the description. The number of group pairs foreseen in each particular case depends on the specific mixing or heat exchange task. If in the subsequent text, only the first and second group is described, it can't be inferred therefrom, that only this particular embodiment is disclosed, in contrary, any embodiments comprising a plurality of group pairs, whereby each of these group pairs consist of a first and a second group, are intended to be included by this description. For the reason of simplicity the description is confined to one of the group pairs. For the description for any further group pairs 25, 35, 26, 36 it is referred to the description above.

The channels 11, 12 run in the interior of the web elements 9, 10 such that no connection exists between the channels and the interior of the web elements and the mixing space 80, which contains the web elements.

The first and second group planes are arranged in an angle of 25 up to and including 75 degrees with respect to the longitudinal axis 4, in many cases the angle is substantially 45 degrees with respect to the longitudinal axis. 4.

The groups arranged in series are advantageously arranged in such a manner that they overlap in order to provide as much active heat exchange surface as possible in the volume formed by the cladding element 2. Under overlapping it is intended that at least a portion of the web elements of the first group and a portion of the web elements of the subsequent group and/or a portion of the web elements of a preceding group are arranged in the same tubular section when seen in main fluid flow direction. The projection of the length of the web element onto the longitudinal axis results in a length L1 and the projection of the overlapping portion of the web elements of the neighboring group onto the longitudinal axis results in a length L2, whereby L2 is smaller than L1 and larger than 0. The respective tubular section is thereby defined such that it has the length L1 that means it represents the enveloping volume of the centrally arranged web element 9. The enveloping volume is for a cylindrical cladding element with circular cross-section an enveloping cylinder, for a cladding element with a rectangular or polygonal cross-section an enveloping cuboid.

Figure 2:
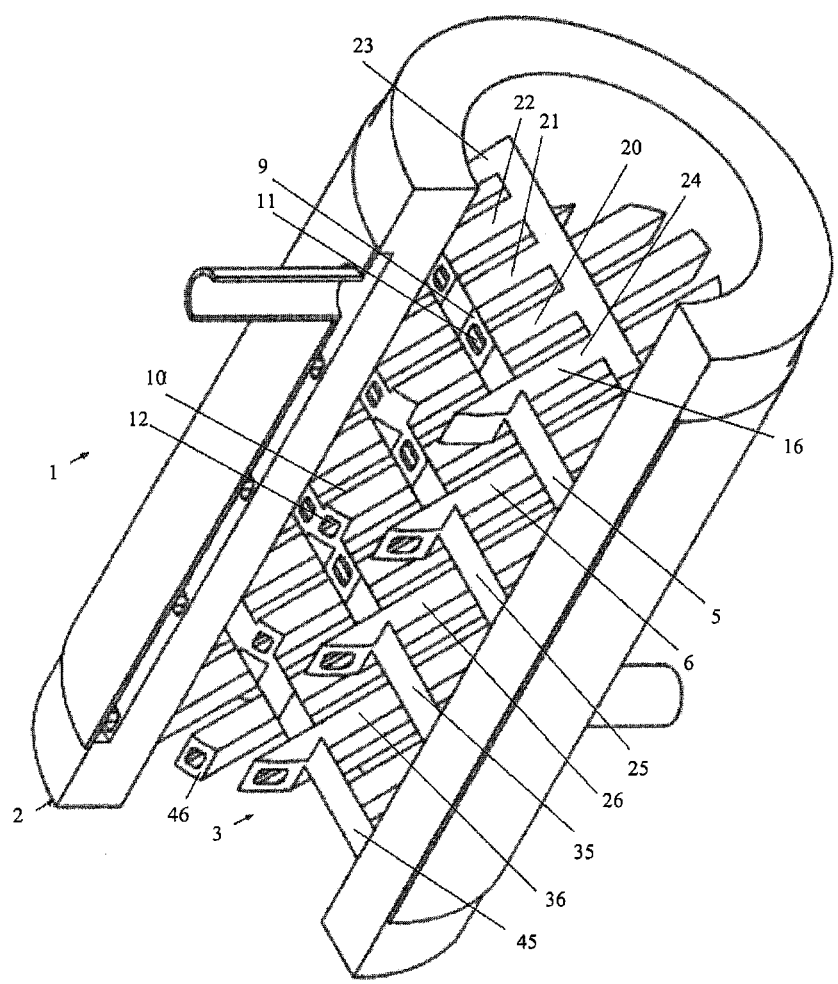
FIG. 2: a three dimensional sectional view through the device according to FIG. 1, FIG. 3: a view of a mixer insert for the device according to FIG. 1, FIG. 4: a three dimensional sectional view of a device according to a second embodiment, FIG. 5 a detail of a transition of a web element to the cladding element according to FIG. 1, FIG. 6 a two dimensional sectional view of a third embodiment of a device according to the invention, FIG. 7 a two dimensional sectional view of a fourth embodiment of a device according to the invention, FIG. 8 a view of a mixer insert according to a fifth embodiment of a device according to the invention.

FIG. 2 shows a three-dimensional sectional view through the device according to FIG. 1. Corresponding parts are designated in FIG. 2 with the same reference numerals and are not further described in as much the description has already been presented in connection with FIG. 1. FIG. 2 shows the web elements 20, 21, 22, 23, 24 pertaining to the group 15.

Figure 3:
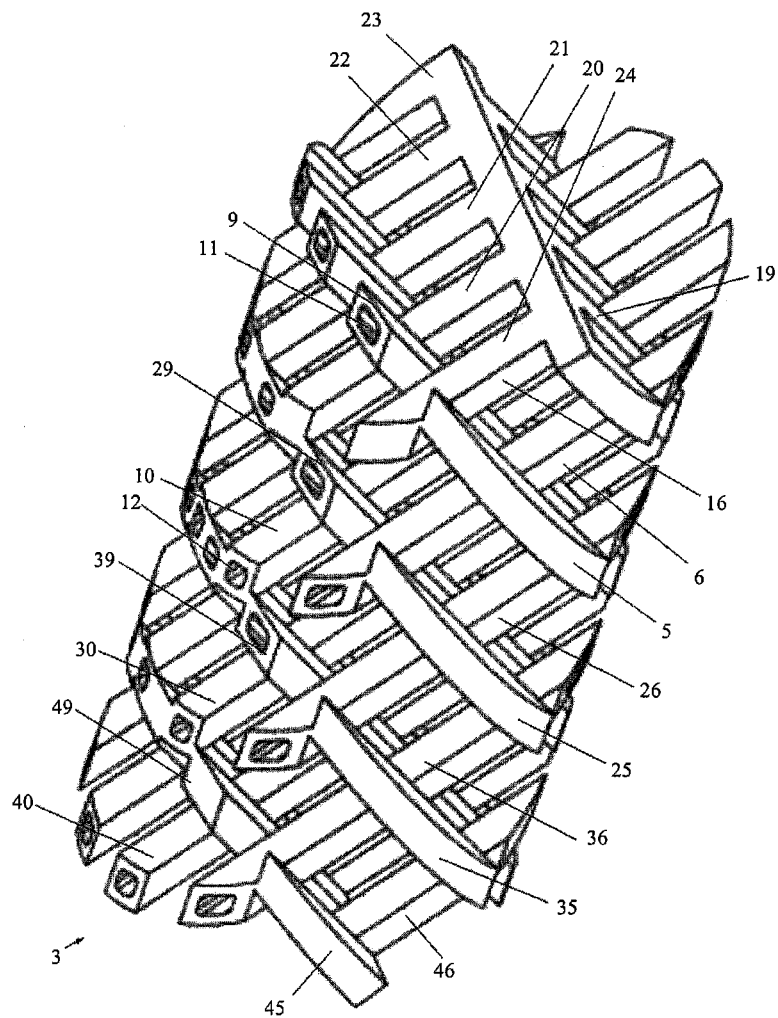

FIG. 3 shows a view of a mixer insert for the device according to FIG. 1. The mixer insert 3 only differs from the one shown in FIG. 1 in that the groups 45, 46 don not contain channels.

Figure 4:
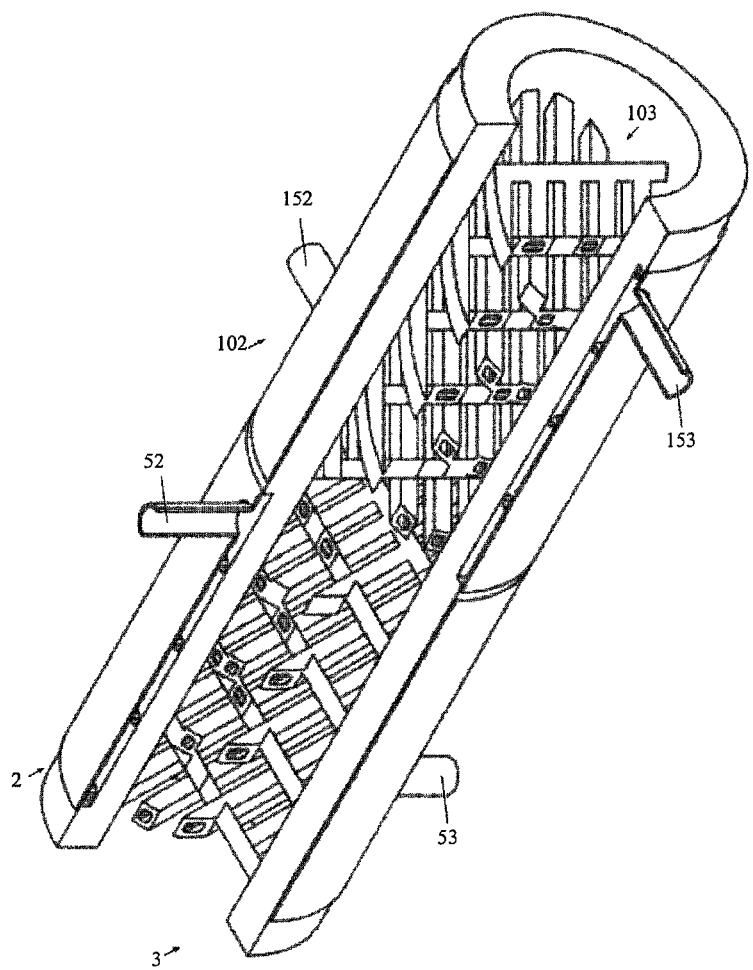

FIG. 4 shows a three-dimensional sectional view of a device according to a second embodiment, in which a first mixer insert 3 and a second mixer insert 103 are arranged in series in a first cladding element 2 and a second cladding element 102. The first cladding element 2 and the first mixer insert 3 are rotated about an angle of 90 degrees in relation to the second cladding element 102 and the second mixer insert 103. The supply of heat exchange fluid to the mixing space is provided by a first feed stub 52 and its discharge by a first discharge stub 53. Due to the fact that the second cladding element 102 is rotated as a whole about 90 degrees with respect to the first cladding element 2, the second feed stub 152 and the second discharge stub 153 is also rotated about an angle of 90 degrees.

Figure 6:
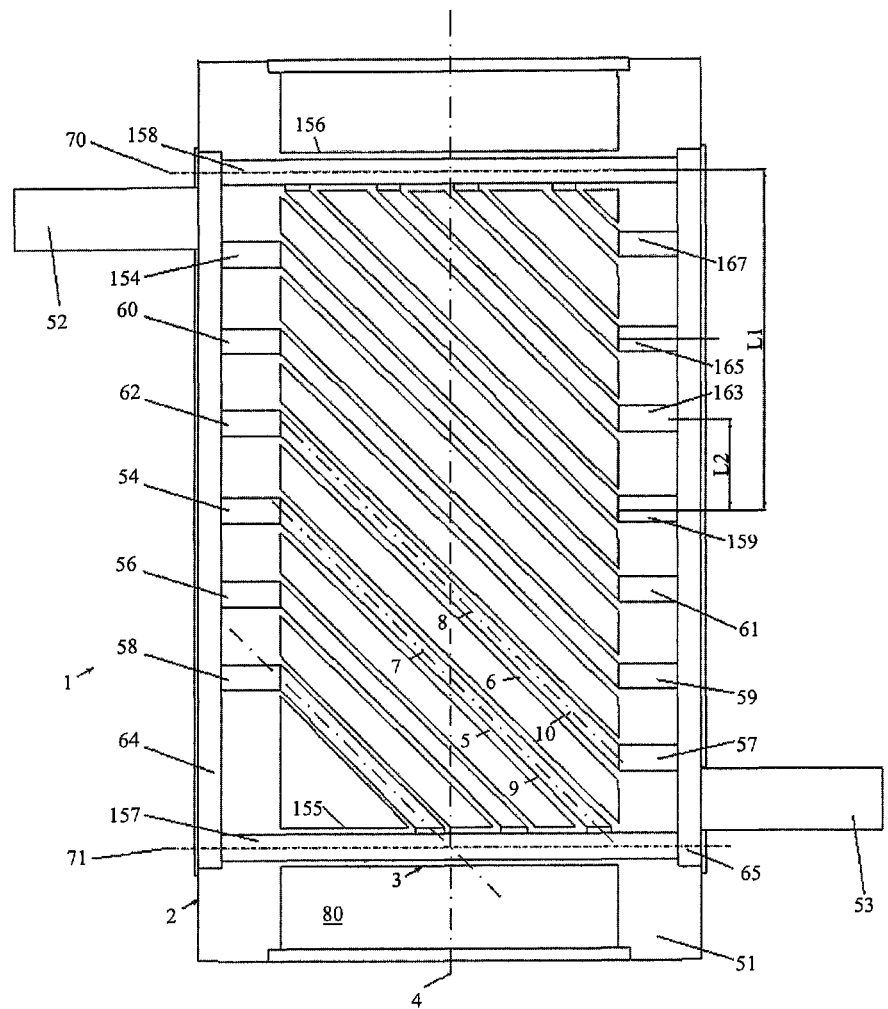

FIG. 6 shows a two-dimensional sectional view of a third embodiment of a device according to the invention. The device 1 consists of a cladding element 2 and a mixer insert 3, which have a common longitudinal axis 4.

A first group 5 and a second group 6 of web elements extend along the longitudinal axis 4. The groups are arranged along a first group plane 7 and a second group plane 8. A web element 9 of the first group is shown in cross-section as well as a web element 10 of the second group. The first group plane and the second group plane extend substantially parallel to each other, which constitutes a difference to the previous embodiments. The web elements which would end in the end plane 71 can be connected by a collection channel 155. In particular the collection element 155 can have a collection channel 157. The web elements which start in the end plane 70 can be connected to a distribution element 156. The distribution element 156 can comprise a distribution channel 158.

The heat exchange fluid is fed by the feed stub to a distribution channel 64 arranged in the cladding element 2. The heat exchange fluid runs from the distribution channel 64 via the feed channels 54, 56, 58, 60, 62, 154 as well as via the distribution channel 158 into the channels of the web elements. The heat exchange fluid is received after having passed these feed and distribution channels by the collection channel 157 as well as the discharge channels 57, 59, 61, 63, 159, 161, 163, 165, 167. From the discharge channels, the heat exchange fluid is fed into the collection channel 65 and discharged via the discharge stub 53. The flowable medium flows around the web elements into the mixing space 80.

From the discharge channels the heat exchange fluid reaches the collection channel 65 and is discharge by the discharge stub 53. The flowable medium flows around the web elements into the mixing space 80.

Figure 7:
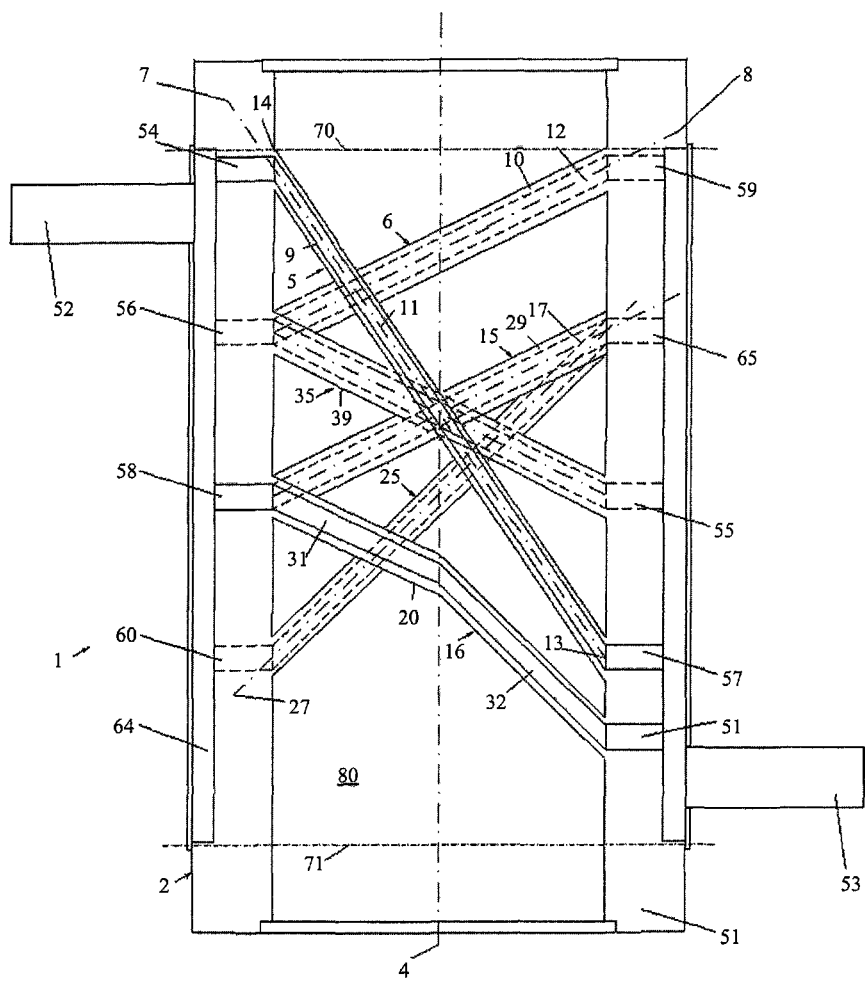

FIG. 7 shows a two-dimensional sectional view of a fourth embodiment of a device according to the invention. The sectional view shows, that the arrangement of web elements may occur in arbitrary angles. In particular a first web element 9 of a first group 5 and a second web element 10 of a second group 6 is shown. A plurality of corresponding or different web elements 9 can be arranged along the first group plane 7. The web elements of this group which are arranged behind the web element 9 are no visible in this drawing. The angle which is enclosed between the pictured intersection line of the first group plane 7 and the longitudinal axis 4 in the plane of the drawing differs from the angle, which is enclosed between the pictured intersection lines of the second group plane 8 with the longitudinal axis 4 in the plane of the drawing. The width of the web elements of the first group can be different from the width of the web elements of the second group.

Neighboring groups can have either group planes arranged in parallel or can include differing angles with respect to the longitudinal axis 4. A partial group 15 is shown, which has a group plane 17 arranged parallel to the group plane 8. A further partial group 25 is shown as a variant whose group plane 27 is not arranged in parallel to the group plane 8, but encloses a smaller angle to the longitudinal axis 4.

According to a further variant it is shown that more than two groups can intersect and can be connected via common connection elements. The group 5 can for example be connected with the partial group 15 and the partial group 35 via common connection elements. The connection elements are not shown, they can be lateral web elements which are arranged normally with respect to the plane of drawing and can connect exemplarily group 5 and partial group 15 in the region of the intersection point. In the same manner, the partial group 15 can be connected to the partial group 35.

As a further variant a partial group 16 is shown. The partial group 16 contains a web element 20, which has two web element sections 31, 32. The web element sections 31, 32 enclose an angle with respect to each other. It would be also possible to connect the first web element portion and the second web element portion via a curved portion, whereby this variant is not shown in the drawings.

FIG. 8 is a view of a device according to a fifth embodiment. The device consists of a mixer insert 3 and a cladding element 2. This mixer insert 3 is built into a cladding element 2 with a rectangular cross-sectional area. Other cross-sectional areas are possible, for instance circular cross-sectional areas. This drawing shows a first group 5 as well as a second group 6 of web elements. The web elements 9, 19 of the first group 5 are equivalent and arranged parallel to each other. The web elements 10, 20 of the second group 6 are equivalent and arranged parallel to each other. The web elements 9, 19 enclose an angle with the web elements 10, 20. That means according to this variant, neighboring web elements belong at least partially to the same group.

Downstream of the first group 5 and the second group 6, there is arranged a first partial group 15 and a second partial group 16. The web elements of the partial groups 15, 16 are rotated about the longitudinal axis 5 by an angle of 90 degrees compared to the web elements of the first and second groups 5, 6. The mixer insert 3 contains a further partial group 25 and a further partial group 26. Both of the partial groups 25, 26 are mirrored about a normal plane of the longitudinal axis 4.

In FIG. 8 the channels running inside the web elements are shown as well. The channel 11 of the web element 9 has an oval or circular cross-section. The channels may have other cross-sectional surfaces. By way of casting, a multitude of different cross-sectional areas may be used. The web element 29 shows a channel 31 with a rectangular cross-sectional area. Triangular or polygonal cross-sectional areas can be realized in the same manner.

The cladding element 2 is shown only partially. The cladding element 2 comprises a feed stub 52 as well as a distribution channel 64, which is shown in portion. The distribution channel 64 is in connection with a part of the channels in the web elements. A heat exchange fluid which is supplied by the feed stub can be distributed through the distribution channel 64 to the channels of the web elements. Not shown is a corresponding collection channel which is connected to another part of the channels in the web elements. The ends of the web elements arranged oppositely to the distribution channel join in the collection channel. From the collection channel the heat exchange fluid flows into the discharge stub and can leave the device 1 via the discharge stub.

The invention is not limited to the embodiments mentioned above. The web elements can be different in their number and dimension. Furthermore, the number of channels in the web elements can differ according to the required heat for a heat exchange. The angles of inclination which the groups form with respect to the longitudinal axis can vary depending on the application. More than two mixer inserts can be arranged in series.

The invention claimed is:

1. Device for static mixing and heat exchange comprising
a cylindrical cladding element of predetermined internal diameter, and
a mixer insert arranged inside said cladding element and configured as a single piece, said mixer insert having a longitudinal axis and contains a mixer insert section consisting of a first group of web elements and a second group of web elements, whereby said first group of web elements extends along a first common group plane and said second group of web elements extends along a second common group plane characterized in that at least a portion of said web elements is provided with web element channels extending from a first end of the web element to a second end of the web element,
whereby said cladding element comprises a corresponding channel in fluid connection with said first end and said second end of the web element,
whereby a transition from at least one of the first and second ends of the web element to the corresponding channel in said cladding element is a rounded portion free from gaps,
whereby the length of said web element channel is greater than a mean diameter of said cladding element and
whereby the mean diameter of said cladding element corresponds to the mean diameter of the interior space of said cladding element in which said mixer insert is positioned.

2. Device according to claim 1, whereby the channels extend inside the web elements such that no connection between the channels inside the web elements and a mixing space, which surrounds the web elements, is established.

3. Device according to claim 1, whereby the first and second group plane are arranged in an angle of 25° up to and including 75° degrees with respect to said longitudinal axis.

4. Device according to claim 1, whereby 2 up to and including 20 web elements of a group are arranged in parallel to each other.

5. Device according to claim 1 comprising a plurality of mixer insert sections consisting of a first group and a second group of web elements whereby two neighboring mixer insert sections overlap whereby the projection of the length of the web element onto said longitudinal axis results in a length L1 and the projection of the overlapping part of the web elements of the neighboring group onto said longitudinal axis results in a length L2 whereby L2 is smaller than L1 and L2 is greater than 0.

6. Device according to claim 1, whereby said first group of web elements is arranged transversely to said second group of web elements at an angle of 80 to 100 degrees.

7. Device according to claim 1, whereby said first common group plane of the first group intersects with said second common group plane of the second group to form a common intersection line having an intersection point with said longitudinal axis or extends transversal to the longitudinal axis and/or has a minimal distance to the longitudinal axis in a normal plane to the intersection line, which contains the longitudinal axis.

8. Device according to claim 1, whereby at least one group of web elements extends only to an intersection line.

9. Device according to claim 1, whereby at least half of said web elements contain a channel for a heat exchange fluid.

10. Device according to claim 1, whereby said cladding element contains a distribution channel to supply heat exchange fluid to said channels of said web elements.

11. Device according to claim 1, whereby said rounded portion has a radius of 0.5 mm.

12. The device according to claim 1, whereby said cladding element and said mixer insert are configured as a monolithic structure, wherein a monolithical structure is manufactured at least in segments consisting of a first and second group of web elements arranged in an angle to the main direction of fluid flow which is not equal to zero and a cladding element which is fixed to at least a portion of the web elements, whereby the cladding element can be configured as a cladding tube.

13. Device for static mixing and heat exchange comprising
a cylindrical cladding element of predetermined internal diameter having a distribution channel therein for a heat exchange fluid,
a mixer insert arranged inside and monolithic with said cladding element, said mixer insert having a first group of web elements extending along a first common group plane with each web element thereof having a channel extending from a first end of said web element in communication with said distribution channel to a second end of said web element in communication with said distribution channel to conduct heat exchange fluid therethrough and whereby the length of each said web element channel is greater than said diameter of said cladding element and a second group of web elements extending along a second common group plane with each web element thereof having a channel extending from a first end of said web element in communication with said distribution channel to a second end of said web element in communication with said distribution channel to conduct heat exchange fluid therethrough and whereby the length of each said web element channel is greater than said diameter of said cladding element, and wherein a transition from at least one of the first and second ends of the web element to the corresponding channel in said cladding element is a rounded portion free from gaps.

* * * * *